United States Patent [19]
Lee et al.

[11] Patent Number: 5,625,694
[45] Date of Patent: Apr. 29, 1997

[54] METHOD OF INHIBITING TOKEN GENERATION IN AN OPEN METERING SYSTEM

[75] Inventors: David K. Lee, Monroe; David W. Riley, Easton; Frederick W. Ryan, Jr., Oxford, all of Conn.

[73] Assignee: Pitney Bowes Inc., Stamford, Conn.

[21] Appl. No.: 575,106

[22] Filed: Dec. 19, 1995

[51] Int. Cl.⁶ ........................................ H04L 9/00
[52] U.S. Cl. .................. 380/23; 380/24; 380/51; 395/201
[58] Field of Search .................. 380/23–25, 51

[56] References Cited

U.S. PATENT DOCUMENTS

| | | | |
|---|---|---|---|
| 3,845,277 | 10/1974 | Voss et al. | 235/379 |
| 4,725,718 | 2/1988 | Sansone et al. | 235/495 |
| 4,757,537 | 7/1988 | Edelmann et al. | 380/51 |
| 4,775,246 | 10/1988 | Edelmann et al. | 380/23 |
| 4,831,555 | 5/1989 | Sansone et al. | 395/113 |
| 4,873,645 | 10/1989 | Hunter et al. | 364/479.01 |
| 5,173,862 | 12/1992 | Fedirchuk et al. | 364/464.02 |
| 5,319,562 | 6/1994 | Whitehouse | 364/464.03 |

*Primary Examiner*—Thomas H. Tarcza
*Assistant Examiner*—Pinchos M. Laufer
*Attorney, Agent, or Firm*—Charles R. Malandra, Jr.; Melvin J. Scolnick

[57] ABSTRACT

A method is provided for inhibiting the generation of digital tokens in an open metering system that includes a host processor and a vault. The method includes the steps of generating in the host processor a first digital token request that corresponds to a first destination identifier and a first postage amount; determining in the host processor if one of the first destination identifier and the first postage amount is different than a prior destination identifier and a prior postage mount, respectively, that correspond to an immediately preceding digital token request; sending the first digital token request to the vault when the first destination identifier and the first postage amount are different than the prior destination identifier and the prior postage amount, respectively; and rejecting the first digital token request when the first destination identifier and the first postage amount are the same as the prior destination identifier and the prior postage amount, respectively. The method includes the further steps of notifying a user when the first destination identifier and the first postage amount are the same as the prior destination identifier and the prior postage amount; providing the user with a capability to confirm that the first digital token request is valid; and sending the first digital token request to the vault when the user confirms that the first digital token request is valid.

10 Claims, 7 Drawing Sheets

METHOD OF INHIBITING TOKEN GENERATION IN AN OPEN METERING SYSTEM

FIELD OF THE INVENTION

The present invention relates to advanced postage payment systems and, more particularly, to advanced postage payment systems having pre-computed postage payment information.

RELATED APPLICATIONS

The present application is related to the following U.S. patent applications Ser. Nos. 08/575,107; 08/574,746; 08/574,745; 08/575,110; 08/574,743; 08/575,112; 08/575,109; 08/575,104; 08/574,749 and 08/575,111, each filed concurrently herewith, and assigned to the assignee of the present invention.

BACKGROUND OF THE INVENTION

The USPS is presently considering requirements for two metering device types: closed systems and open systems. In a closed system, the system functionality is solely dedicated to metering activity. Examples of closed system metering devices, also referred to as postage evidencing devices (PEDs), include conventional digital and analog postage meters wherein a dedicated printer is securely coupled to a metering or accounting function. In a closed system, since the printer is securely coupled and dedicated to the meter, printing cannot take place without accounting. Furthermore, printing occurs immediately after accounting is concluded.

In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a PED with a non-dedicated printer that is not securely coupled to a secure accounting module.

When a PED prints postage indicia on a mailpiece, the accounting register within the PED must always reflect that the printing has occurred. Postal authorities generally require the accounting information to be stored within the postage meter in a secure manner with security features that prevent unauthorized and unaccounted for postage printing or changes in the amounts of postal funds stored in the meter. In a closed system, the meter and printer are integral units, i.e., interlocked in such a manner as to ensure that the printing of postage indicia cannot occur without accounting.

Since an open system PED utilizes a printer that is not used exclusively for printing proof of postage payment, additional security measures are required to prevent unauthorized printing evidence of postage payment. Such security measures include cryptographic evidencing of postage payment by PEDs in the open and closed metering systems. The postage value for a mail piece may be encrypted together with other data to generate a digital token. A digital token is encrypted information that authenticates the information imprinted on a mail piece including postage values.

Examples of systems for generating and using digital tokens are described in U.S. Pat. Nos. 4,757,537, 4,831,555, 4,775,246, 4,873,645, and 4,725,718, the entire disclosures of which are hereby incorporated by reference. These systems employ an encryption algorithm to encrypt selected information to generate at least one digital token for each mailpiece. The encryption of the information provides security to prevent altering of the printed information in a manner such that any misuse of the tokens is detectable by appropriate verification procedures.

Typical information which may be encrypted as part of a digital token includes origination postal code, vendor identification, data identifying the PED, piece count, postage amount, date, and, for an open system, destination postal code. These items of information, collectively referred to as Postal Data, when encrypted with a secret key and printed on a mail piece provide a very high level of security which enables the detection of any attempted modification of a postal revenue block or a destination postal code. A postal revenue block is an image printed on a mail piece that includes the digital token used to provide evidence of postage payment. The Postal Data may be printed both in encrypted and unencrypted form in the postal revenue block. Postal Data serves as an input to a Digital Token Transformation which is a cryptographic transformation computation that utilizes a secret key to produce digital tokens. Results of the Digital Token Transformation, i.e., digital tokens, are available only after completion of the Accounting Process.

Digital tokens are utilized in both open and closed metering systems. However, for open metering systems, the non-dedicated printer may be used to print other information in addition to the postal revenue block and may be used in activity other than postage evidencing. In an open system PED, addressee information is included in the Postal Data which is used in the generation of the digital tokens. Such use of the addressee information creates a secure link between the mailpiece and the postal revenue block and allows unambiguous authentication of the mail piece.

Preferably, two Digital Tokens are used to authenticate Postal Data and postage payment. The first is produced by a Digital Token Transformation using a secret key held by the Postal Service and the mailer's PED. The second is produced by a Digital Token Transformation using a secret key held by the PED vendor and the mailer's PED. The fact that two independent entities hold separate verification secrets greatly enhances the security of the system because it provides the Postal Service and the vendor with independent means to authenticate the postal revenue block, and thus, verify postage payment. The use of the second Digital Token Transformation using the vendor's secret key is an optional part of the security which authenticates postage payment by a particular vendor's device. The use of two digital tokens (postal and vendor) is described in U.S. Pat. No. 5,390,251, which issued Feb. 14, 1995 to Jose Pastor et al., the entire disclosure of which is hereby incorporated by reference and U.S. patent application Ser. No. 08/242,564, filed May 13, 1994, assigned to the assignee of the present invention.

SUMMARY OF THE INVENTION

As previously described, an inherent difference between closed metering systems and open metering systems is the printer. The printer in a closed metering system is a secure device that is dedicated for printing evidence of postage. Thus, the printing function in a closed metering system is dependent on the metering function. This contrasts to an open metering system printer, which is a non-secure, non-dedicated printer that prints typical PC related documents in addition to printing evidence of postage. Thus, the printing function in an open metering system is independent of the metering function. The present invention provides a process in an open metering system for requesting, calculating, storing and issuing one or more digital tokens that can be used at a later time in the generation of one or more indicia images.

In accordance with the present invention some of the functionality typically performed in the vault of a conventional postage meter has been removed from the vault of a PC-based open metering system and is performed in the PC. It has been discovered that this transfer of functionality from the vault to the PC does not effect the security of the meter because the information being processed includes addressee information. It has also been discovered that in a PC-based open metering system tokens can be issued and then stored for generating and printing indicia at a later time. It has further been discovered that a token can be reissued if the token is never printed or if a problem occurs preventing a printing of indicia with the token.

The present invention provides a token generation process for an open metering system, such as a PC-based metering system that comprises a PC, special Windows-based software, a printer and a plug-in peripheral as a vault to store postage funds. The PC meter uses a personal computer and its non-secure and non-dedicated printer to generate digital tokens and later print evidence of postage on envelopes and labels at the same time it prints a recipient address.

The present invention provides a token generation process for an open metering system that includes security that prevents tampering and false evidence of postage payment. The present invention further provides a token generation process that includes the ability to do batch processing of digital tokens.

In accordance with the present invention a method is provided for inhibiting the generation of digital tokens in an open metering system that includes a host processor and a vault. The method includes the steps of generating in the host processor a first digital token request that corresponds to a first destination identifier and a first postage mount; determining in the host processor if one of the first destination identifier and the first postage amount is different than a prior destination identifier and a prior postage amount, respectively, that correspond to an immediately preceding digital token request; sending the first digital token request to the vault when the first destination identifier or the first postage amount are different than the prior destination identifier or the prior postage amount, respectively; and rejecting the first digital token request when the first destination identifier and the first postage amount are the same as the prior destination identifier and the prior postage amount, respectively. The method includes the further steps of notifying a user when the first destination identifier and the first postage amount are the same as the prior destination identifier and the prior postage amount; providing the user with a capability to confirm that the first digital token request is valid; and sending the first digital token request to the vault when the user confirms that the first digital token request is valid.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
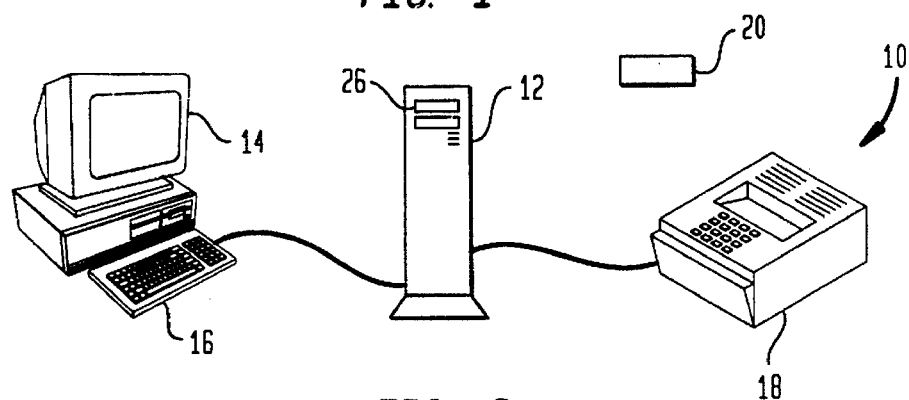
FIG. 1. is a block diagram of a PC-based metering system in which the present invention operates.

In describing the present invention, reference is made to the drawings, wherein there is seen in FIGS. 1–4 an open system PC-based postage meter, also referred to herein as a PC meter system, generally referred to as 10, in which the present invention performs the digital token process. PC meter system 10 includes a conventional personal computer configured to operate as a host to a removable metering device or electronic vault, generally referred to as 20, in which postage funds are stored. PC meter system 10 uses the personal computer and its printer to print postage on envelopes at the same time it prints a recipient's address or to print labels for pre-addressed return envelopes or large mailpieces. It will be understood that although the preferred embodiment of the present invention is described with regard to a postage metering system, the present invention is applicable to any value metering system that includes a transaction evidencing.

As used herein, the term personal computer is used generically and refers to present and future microprocessing systems with at least one processor operatively coupled to user interface means, such as a display and keyboard, and storage media. The personal computer may be a workstation that is accessible by more than one user.

The PC-based postage meter 10 includes a personal computer (PC) 12, a display 14, a keyboard 16, and an non-secured digital printer 18, preferably a laser or ink-jet printer. PC 12 includes a conventional processor 22, such as the 80486 and Pentium processors manufactured by Intel, and conventional hard drive 24, floppy drive(s) 26, and memory 28. Electronic vault 20, which is housed in a removable card, such as a PCMCIA card, is a secure encryption device for postage funds management, digital token generation and traditional accounting functions. PC meter system 10 may also include an optional modem 29 which is located preferably in PC 12. Modem 29 may be used for communicating with a Postal Service or a postal authenticating vendor for recharging funds (debit or credit). In an alternate embodiment the modem may be located in the PCMCIA card.

Figure 2:
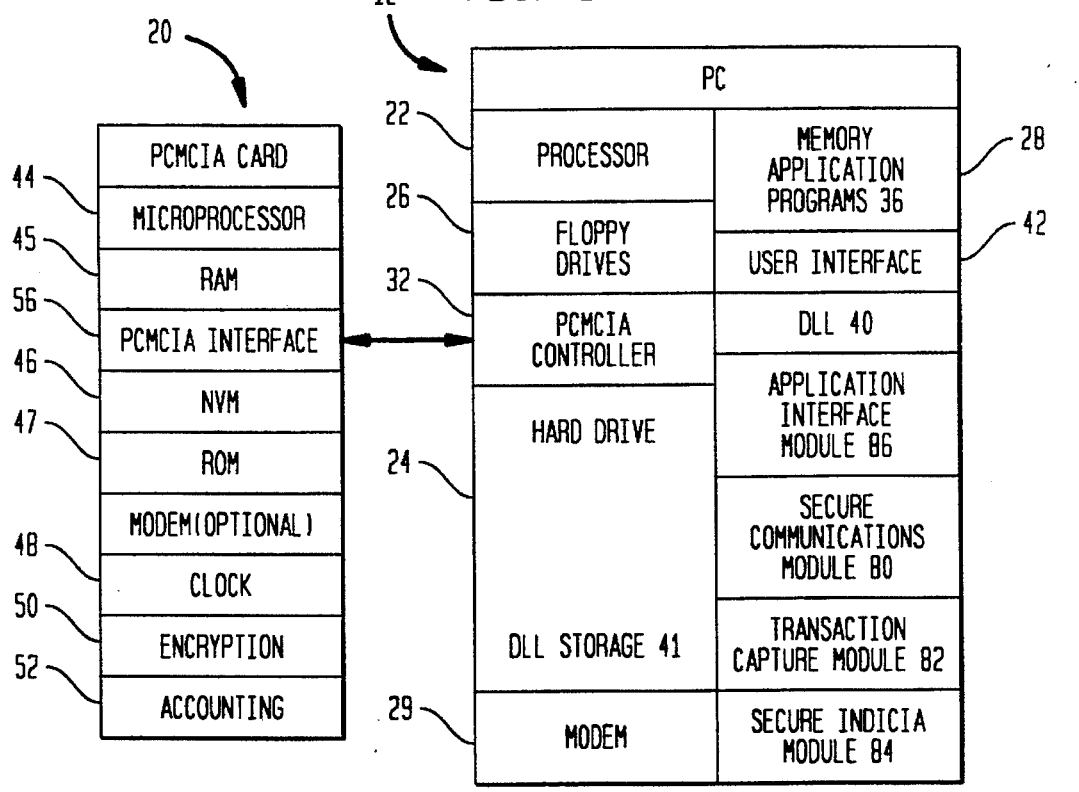
FIG. 2 is a schematic block diagram of the PC-based metering system of FIG. 1 including a removable vault card and a DLL in the PC.

PC meter system 10 further includes a Windows-based PC software module 34 (FIG. 4) that is accessible directly from conventional Windows-based word processing, database and spreadsheet application programs 36 or from a user interface module 42 (FIG.2). PC software module 34 includes a vault dynamic link library (DLL) 40, and a plurality of sub-modules that control the metering functions. DLL module 40 securely communicates with vault 20 and provides an open interface to Microsoft Windows-based application programs 36 through user interface module 42. DLL module 40 also securely stores indicia image and a copy of the usage of postal funds of the vault. User interface module 42 provides application programs 36 access to an electronic indicia image from DLL module 40 for printing the postal revenue block on a document, such as an envelope or label. User interface module 42 also provides application programs the capability to initiate remote refills and to perform administrative functions.

Thus, PC-based meter system 10 operates as a conventional personal computer with attached printer that becomes a postage meter upon user request. Printer 18 prints all documents normally printed by a personal computer, including printing letters and addressing envelopes, and in accordance with the present invention, prints postage indicia.

Figure 3:
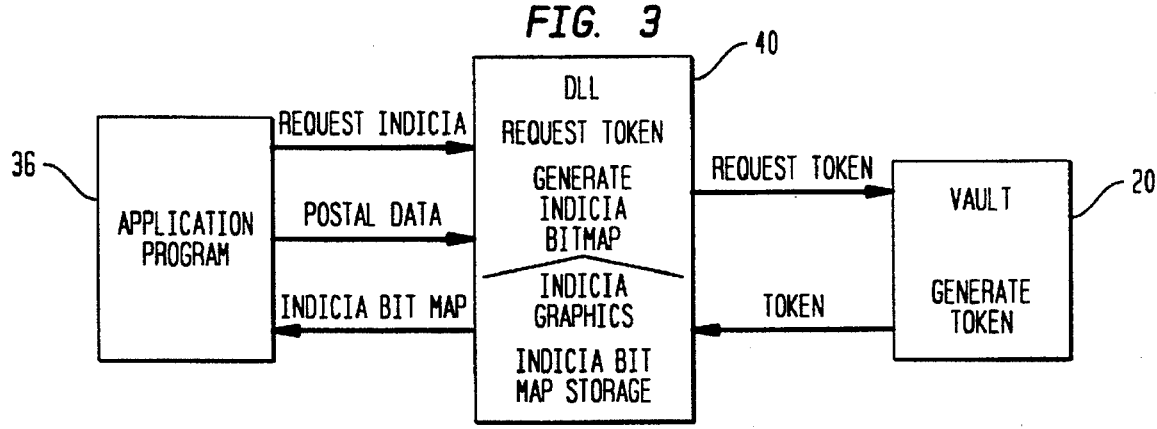
FIG. 3 is a schematic block diagram of the DLL in the PC-based metering system of FIG. 1 including interaction with the vault to issue and store digital tokens.
Figure 4:
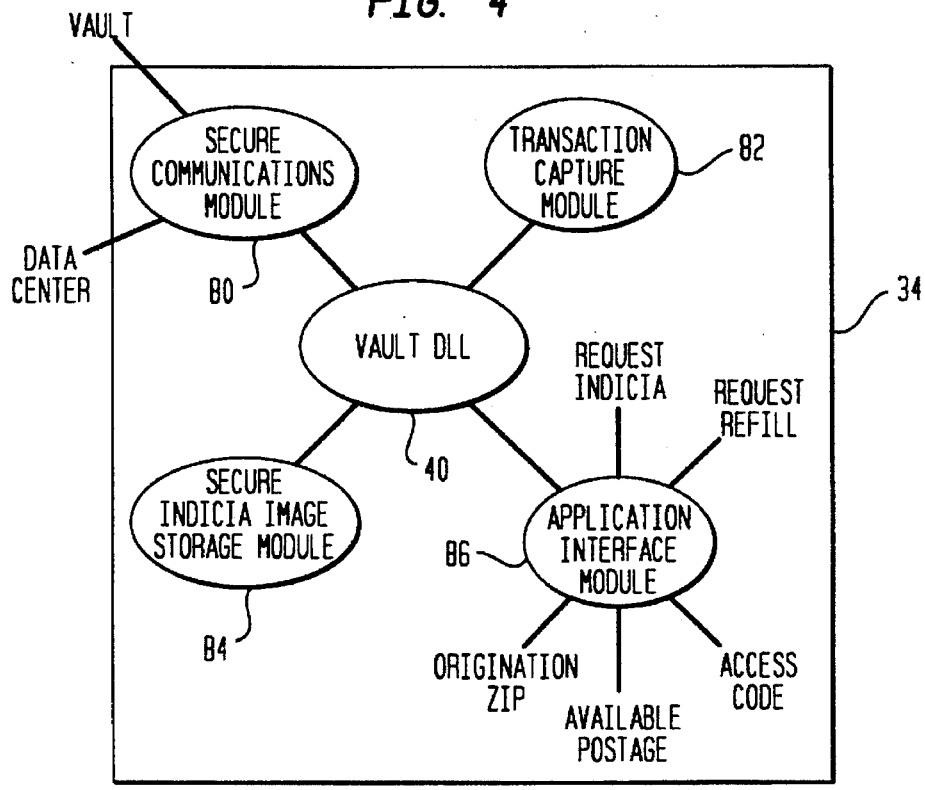
FIG. 4 is a block diagram of the DLL sub-modules in the PC-based metering system of FIG. 1.

The vault is housed in a PCMCIA I/O device, or card, which is accessed through a PCMCIA controller 32 in PC 12. A PCMCIA card is a credit card size peripheral or adapter that conforms to the standard specification of the Personal Computer Memory Card International Association. Referring now to FIGS. 2 and 3, the PCMCIA card includes a microprocessor 44, redundant non-volatile memory (NVM) 46, clock 48, an encryption module 50 and an accounting module 52. The encryption module 50 may implement the NBS Data Encryption Standard (DES) or another suitable encryption scheme. In the preferred embodiment, encryption module 50 is a software module. It will be understood that encryption module 50 could also be a separator device, such as a separate chip connected to microprocessor 44. Accounting module 52 may be EEPROM that incorporates ascending and descending registers as well as postal data, such as origination ZIP Code, vendor identification, data identifying the PC-based postage meter 10, sequential piece count of the postal revenue block generated by the PC-based postage meter 10, postage amount and the date of submission to the Postal Service. As is known, an ascending register in a metering unit records the amount of postage that has been dispensed, i.e., issued by the vault, in all transactions and the descending register records the value, i.e., amount of postage, remaining in the metering unit, which value decreases as postage is issued.

The hardware design of the vault includes an interface 56 that communicates with the host processor 22 through PCMCIA controller 32. Preferably, for added physical security, the components of vault 20 that perform the encryption and store the encryption keys (microprocessor 44, ROM 47 and NVM 46) are packaged in the same integrated circuit device/chip that is manufactured to be tamper proof. Such packaging ensures that the contents of NVM 46 may be read only by the encryption processor and are not accessible outside of the integrated circuit device. Alternatively, the entire card could be manufactured to be tamper proof.

The memory of each NVM 46 is organized into sections. Each section contains historical data of previous transactions by vault 20. Examples of the types of transactions include: postage dispensed, tokens issued, refills, configuration parameters, and postal and vendor inspections. The size of each section depends on the number of transactions recorded and the data length of the type of transaction. Each section in turn is divided into transaction records. Within a section, the length of a transaction record is identical. The structure of a transaction record is such that the vault can check the integrity of data.

The functionality of DLL 40 is a key component of PC-based meter 10. DLL 40 includes both executable code and data storage area 41 that is resident in hard drive 24 of PC 12. In a Windows environment, a vast majority of applications programs 36, such as word processing and spreadsheet programs, communicate with one another using one or more dynamic link libraries. PC-base meter 10 encapsulates all the processes involved in metering, and provides an open interface to vault 20 from all Windows-based applications capable of using a dynamic link library. Any application program 36 can communicate with vault microprocessor 44 in the PCMCIA card through DLL 40.

DLL 40 includes the following software sub-modules. Secure communications sub-module 80 controls communications between PC 12 and vault 20. Transaction captures sub-module 82 stores transaction records in PC 12. Secure indicia image creation and storage sub-module 84 generates an indicia bitmap image and stores the image for subsequent printing. Application interface sub-module 86 interfaces with non-metering application programs and issues requests for digital tokens in response to requests for indicia by the non-metering application programs. A more detailed description of PC meter system 10 is provided in related U.S. patent application Ser. No. 08/575,112 filed concurrently herewith.

Since printer 18 is not dedicated to the metering function, issued digital tokens may be requested, calculated and stored in PC 12 for use at a later time when, at a user's discretion, corresponding indicia are generated and printed. Such delayed printing and batch processing is described in more detail in co-pending U.S. patent application Ser. No. 08/575,104.

Digital Token Generation Process

In accordance with the present invention, when a request for a digital token is received from PC 12, vault 20 calculates and issues at least one digital token to PC 12 in response to the request. The issued digital token is stored as part of a transaction record in PC 12 for printing at a later time. In the preferred embodiment of the present invention, the transaction record is stored in a hidden file in DLL storage area 41 on hard drive 24. Each transaction record is indexed in the hidden file according to addressee information. It has been discovered that this method of issuing and storing digital tokens provides an additional benefit that one or more digital tokens can be reissued whenever a token has not been printed or if a problem has occurred preventing a printing of indicia with the token.

By storing digital tokens as part of transaction records in PC 12 the digital tokens can be accessed at a later time for the generation and printing of indicia which is done in PC 12. Furthermore, if a digital token is lost, i.e., not properly printed on a mailpiece, the digital token can be reissued from DLL 40 rather than from vault 20. The storage of transaction records that include vault status at the end of each transaction provides a backup to the vault with regard to accounting information as well as a record of issued tokens. The number of transaction records stored on hard drive 24 may be limited to a predetermined number, preferably including all truncations since the last refill of vault 20.

Figure 5:
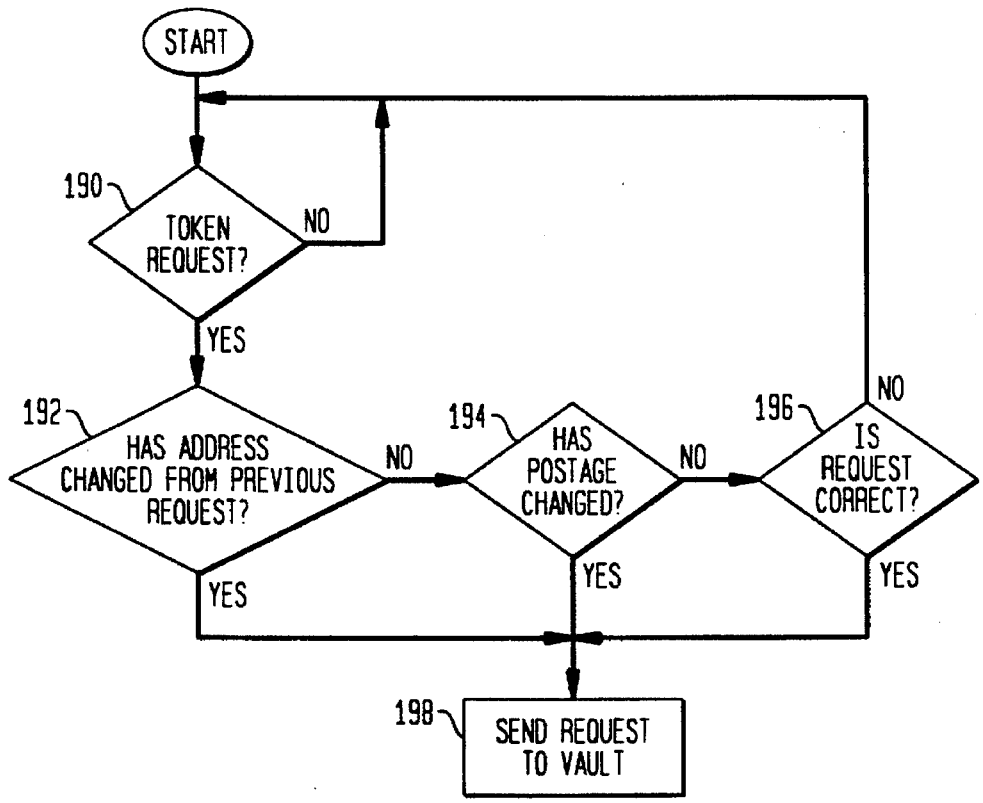
FIG. 5 is a flow chart of token generation inhibitor process for inadvertent token requests.

Referring now to FIG. 5, a process for inhibiting inadvertent requests for digital tokens is shown. In the preferred embodiment, this process occurs in PC 12, but could take place in vault 20. When a token request is detected at step 190, a check is made at step 192 to determine if the addressee information has changed from the addressee information from the previous token request. If it hasn't changed, the postage amount is checked at step 194 to determine if the postage amount has changed from the previous token request. If either the addressee information or the postage amount has changed, the token request is sent to vault 20 at step 198. If neither has changed, the at step 196, a message is sent to the user inquiring whether the request is correct. If the user responds that it is a correct request, then the token request is sent to vault 20 at step 198. If not the token request is not sent to vault 20.

Figure 6A:
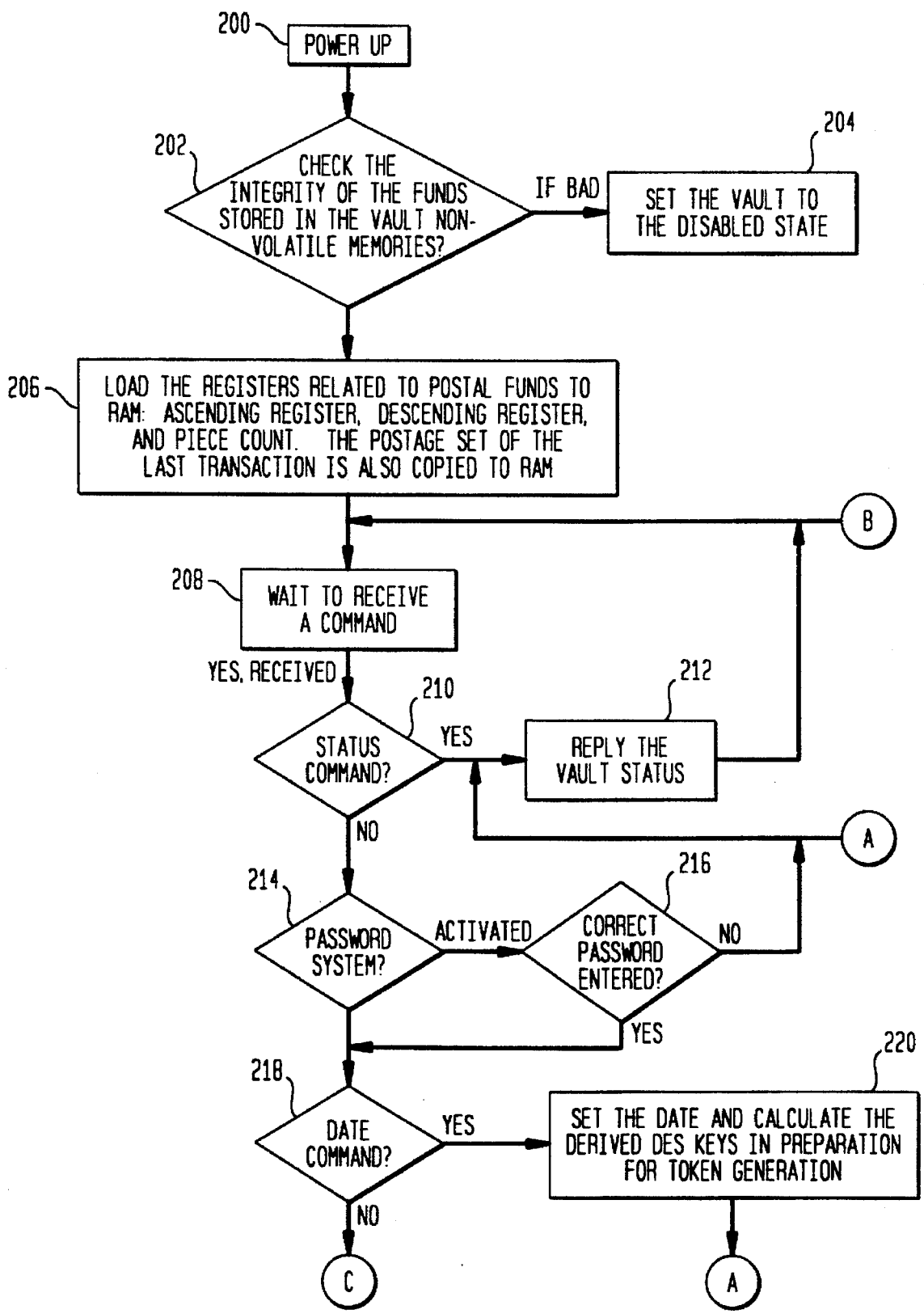
FIG. 6 (6A–6C) is a flow chart of a digital token generation process of the present invention.
Figure 6B:
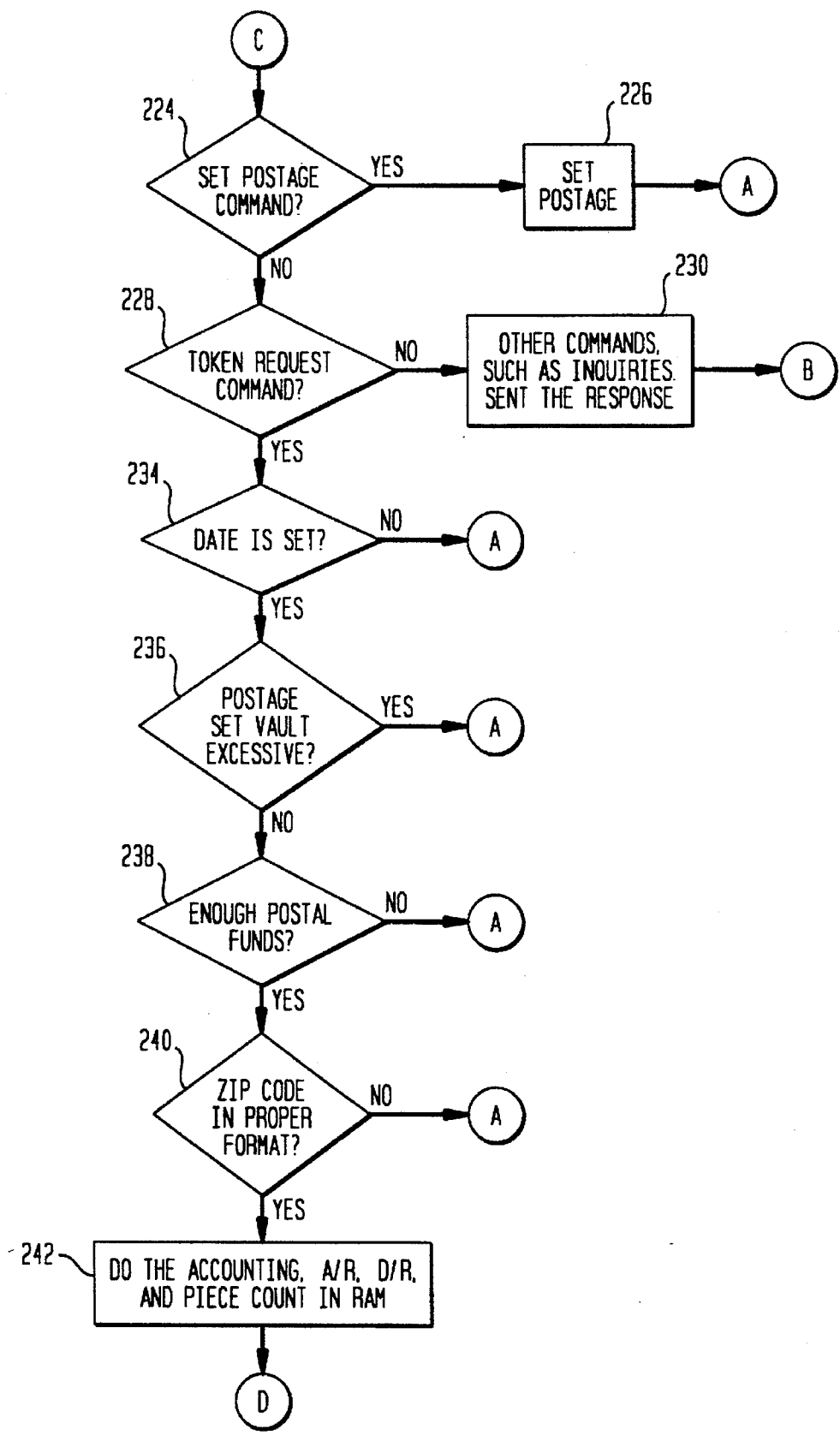
Figure 6C:
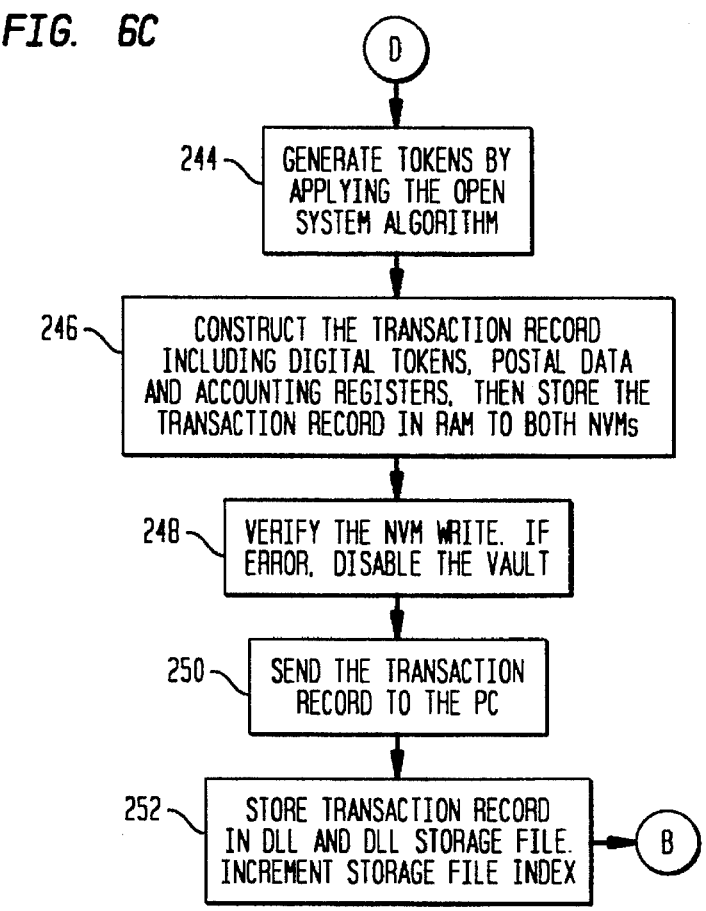

Referring now to FIGS. 6A–6C, when power is applied, at step 200, to vault 20, i.e. when the PCMCIA card is inserted into controller 32, the vault initializes itself. At step 202, vault 20 checks the integrity of the funds stored in the redundant NVM 46. If bad, vault 20 sets itself into a disabled state, at step 204. If the NVM data is correct, then, at step 206, the registers related to postal funds, i.e., the ascending, descending and piece count registers, are loaded to RAM 45 and the most recent transaction record is also loaded into RAM 45. After verifying the data integrity of NVM 46 and copying the most recent records into vault's RAM 45, vault 20 is initialized and thereafter waits for an external command, at step 208.

When a status command is received, at step 210, vault 20 replies to PC 12 with its current status, at step 212. If a password is required to access vault 20 functions, at step 216 an entered password is checked for correctness.

When a command to set the date is received, at step 218, for the first time in a particular month, the vault, at step 220, sets the date and derives token generation keys for the month from master keys stored in NVM 46 of the vault. The vault then enables itself and is ready to receive a token request command. Once the date is set, when another date set command is received in the same month, the vault simply acknowledges the command and sets the date without re-calculating the token generation keys. At step 224, a postage command is received and a postage value, for example, $0.32, is set at step 226.

When a token request command comprising a destination postal code is received by vault 20, at step 228, it checks the format of and the range of values in the request at steps 234–240. If the request is improper, vault 20 rejects the request and sends a status message to user application program 36 via DLL 40 at step 212. Vault 20 checks the date in the request, at step 234, and then compares, at step 236, the requested postage amount with the two warning values: high value warning and the postage limit amount. If the request exceeds the warning values, the request is rejected. (The warning values in vault 20 cannot be changed by a user in normal mode.) Vault 20 then compares, at step 238, the requested postage amount with available postal funds in the descending register. If the amount of available postal funds is smaller than the requested amount, the vault rejects the token request command and sends an appropriate message to user application program 36 via DLL 40. If the amount of available postal funds is greater than or equal to the requested amount, vault 20 checks the destination information at step 240.

Finally, at step 242 vault 20 begins the accounting process to issue a digital token. Vault 20 deducts the requested postage amount from the available postal funds, i.e., adds the amount to the ascending register and subtracts the amount from the descending register, in RAM. At step 244 a digital token is calculated using an open system algorithm which includes addressee information. At step 246, vault 20 constructs in RAM 45 a transaction record that includes the piece count and the calculated token and stores the transaction record in an indexed file in the redundant NVM 46. In the preferred embodiment, the NVM transaction file is indexed by piece count. After storing to NVM, vault 20 checks, at step 248, the integrity of NVM 46 to confirm that the data is stored correctly. If an error occurs during this process, tokens are not issued and an error message is reported to the host processor in PC 12. If no error occurs, a transmission buffer that consists of the transaction record is assembled and vault 20 transmits, at step 250, the transaction record to DLL 40 in PC 12. If vault 20 does not receive a positive acknowledgment from PC 12, vault 20 retransmits the message.

Figure 7:
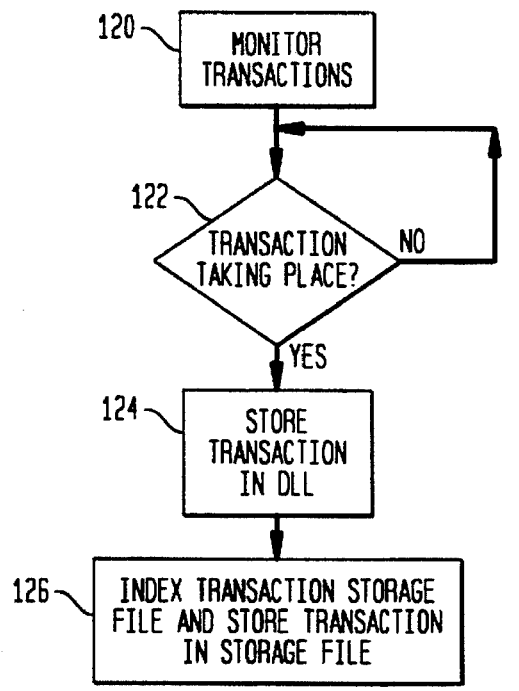
FIG. 7 is a flow chart of the PC storing a transaction record including an issued digital token in the PC-based metering system of FIG. 1.

Conventional postage meters store transactions in the meter. In accordance with the present invention, Transaction Capture sub-module 82 captures each transaction record received from vault 20 and records the transaction record in DLL 40 and in DLL storage area 41 on hard drive 24 for a historical record. If there is ample room on hard drive 24, such transaction captures can be stored for a plurality of different vaults. Referring now to FIG. 7, from the moment that a communication session is established, Transaction Capture sub-module 82 monitors message traffic at step 120, selectively captures each transaction record for token generations and refills, and stores such transaction records in DLL 40 at step 124 in an invisible and write-protected file 83 in DLL storage area 41 at step 126. The information stored for each transaction record includes, for example, vault serial number, date, piece count, postage, postal funds available (descending register), tokens, destination postal code and a block check character. A predetermined number of the most recent records initiated by PC 12 are stored in file 83 which is an historical file indexed according to piece count. File 83 represents the mirror image of vault 20 at the time of the transaction except for the encryption keys and configuration parameters. Storing transaction records on hard drive 24 provides backup capability which is described below. In accordance with the present invention transaction records are maintained for a plurality of issued digital tokens for a predetermined time or count.

Figure 9:
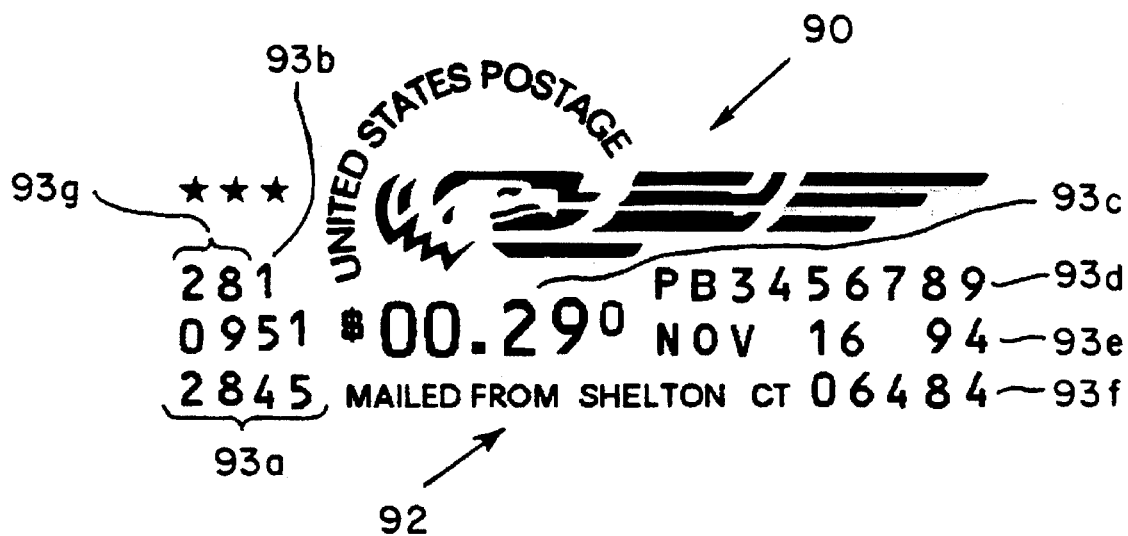
FIG. 9 is an representation of indicia generated and printed by the PC-based metering system of FIG. 1.

In accordance with the present invention, the entire fixed graphics image 90 of the indicia 92, shown in FIG. 9 is stored as compressed data 94 in DLL storage area 41. Postal data information, including piece count 93a, vendor ID 93b, postage amount 93c, serial number 93d, date 93e and origination ZIP 93f and tokens 93g are combined with the fixed graphics image 90 by Indicia Image Creation Module 84.

Figure 8:
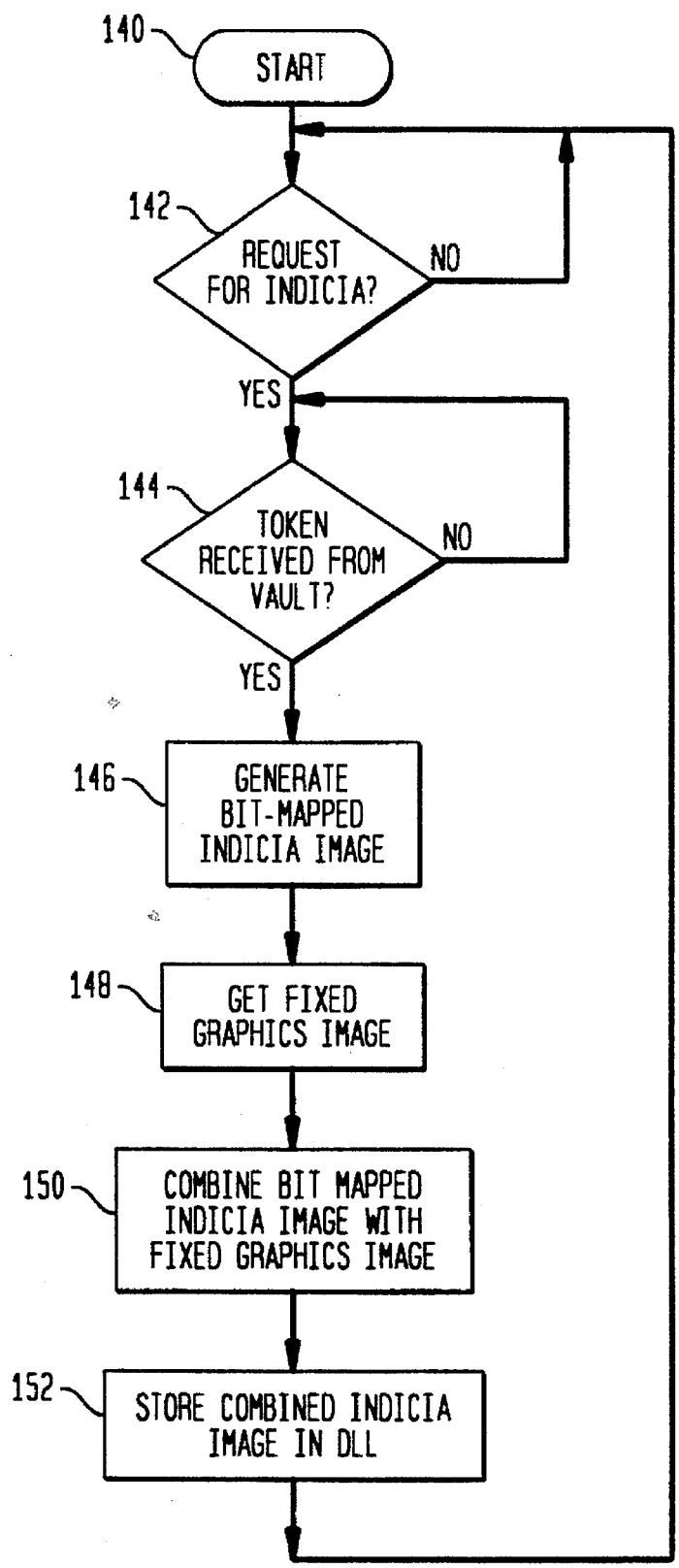
FIG. 8 is a flow chart of the PC generating indicia image for a digital token in the PC-based metering system of FIG. 1.

Referring now to FIG. 8, when a request for indicia is made from an application program in PC 12 at step 142, Indicia Image Creation Module 84 checks for a digital token from vault 20 at step 144, and at step 146 generates a bit-mapped indicia image 96 by expanding the compressed fixed graphics image data 94 at step 148 and combining at step 150 the indicia's fixed graphics image 90 with some or all of the postal data information and tokens received from vault 20. At step 152, the indicia image is stored in DLL 40 for printing. Sub-module 84 sends to the requesting application program 36 in PC 12 the created bit-mapped indicia image 96 that is ready for printing, and then stores a transaction record comprising the digital tokens and associated postal data in DLL storage area 41. At this time, the indicia can be printed immediately or at a later time.

Thus, the bit-mapped indicia image 96 is stored in DLL 40 which can only be accessed by executable code in DLL 40. Furthermore, only the executable code of DLL 40 can access the fixed graphics image 90 of the indicia to generate bit-mapped indicia image 96. This prevents accidental modification of the indicia because it would be very difficult for a normal user to access, intentionally or otherwise, the fixed graphics image 90 of the indicia and the bit-mapped indicia image 96.

The present invention is suitable for generating a batch of tokens for addresses in a mailing list rather than entering such list of addressees one at a time. The batch of tokens are part of a batch of transaction records, that are indexed in the transaction file in the DLL storage area 41, which are later used to generate indicia images when printing envelopes for the mailing list. Such batch processing would be useful, for example, to production mailers which often have databases of addresses from which to generate mail. These databases are usually pre-processed and sorted to take advantage of postal discounts and recipient profiles for direct marketing opportunities.

In an alternate embodiment, a PC-based open metering system is part of a network with the vault connected to a server PC and the user requesting postage from a user PC. The token generation process would proceed as previously described except that the vault functions, including token generation, would occur in the server PC or the vault card connected thereto. The user PC would store the transaction records, including issued tokens, on its hard drive and would generate indicia corresponding thereto. The server PC also stores a record of all transactions for backup and disaster recovery purposes. This configuration would allow multiple users to send a letter to the same addressee without the token generation being inhibited.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. A method of inhibiting issuance of digital tokens in an open metering system comprising a host processor and a vault, the method comprising the steps of:

requesting indicia through user interface means operatively coupled to the host processor, said request for indicia including a first destination identifier and a first postage amount;

generating in the host processor a first digital token request, said first digital token request corresponding to the first destination identifier and the first postage amount;

determining in the host processor if one of the first destination identifier and the first postage amount is different than a prior destination identifier and a prior postage amount, respectively, that correspond to an immediately preceding digital token request;

sending the first digital token request to the vault when the first destination identifier and the first postage amount are different than the prior destination identifier and the prior postage amount, respectively; and rejecting in the host processor the first digital token request when the first destination identifier and the first postage amount are the same as the prior destination identifier and the prior postage amount, respectively, whereby the transmission of the first digital token request from the host processor to the vault and the generation of the first digital token are inhibited.

2. The method of claim 1 including the further steps of:

providing a notification message that the first destination identifier and the first postage amount are the same as the prior destination identifier and the prior postage amount;

displaying said notification message through said user interface means when the first destination identifier and the first postage amount are the same as the prior destination identifier and the prior postage amount;

providing the user with a capability to confirm through said user interface means that the first digital token request is valid; and sending the first digital token request to the vault when the user confirms that the first digital token request is valid.

3. The method of claim 1 including the further step of:

inhibiting in the host processor the generation of the first digital token request if the first destination identifier and the first postal amount are not valid.

4. The method of claim 3 including the further step of:

sending an error message to the user that the destination identifier or the postal amount are not valid;

displaying said error message through said user interface means.

5. The method of claim 1 comprising the further steps of:

rejecting the first digital token request if the postage amount or the destination postal code is not valid;

comparing the postage amount with a postage limit amount and available postage funds stored in the vault; and rejecting the first digital token request if the postage amount exceeds the postage limit amount or the available postage funds.

6. A method of inhibiting issuance of digital tokens in an open metering system comprising a host processor and a vault, the method comprising the steps of:

generating in the host processor a first digital token request, said first digital token request corresponding to a first destination identifier and a first postage amount;

sending the first digital token request to the vault;

determining in the vault if one of the first destination identifier and the first postage amount is different than a prior destination identifier and a prior postage amount, respectively, that correspond to an immediately preceding digital token request;

generating a first digital token in response to the first digital token request to the vault when the first destination identifier and the first postage amount are different than the prior destination identifier and the prior postage amount, respectively; and rejecting in the vault the first digital token request when the first destination identifier and the first postage amount are the same as the prior destination identifier and the prior postage amount, respectively, whereby the generation of the first digital token is inhibited.

7. The method of claim 6 including the further steps of:

sending a reject signal from the vault to the PC;

displaying a message on a display of the PC, the message notifying a user when the first destination identifier and the first postage amount are the same as the prior destination identifier and the prior postage amount;

providing the user with a capability to respond to the message to confirm that the first digital token request is valid;

sending the confirmation to the vault when the user confirms that the first digital token request is valid; and calculating in the vault a first digital token when the confirmation is received.

8. The method of claim 6 including the further step of:

inhibiting in the vault the generation of the first digital token request if the first destination identifier and the first postal amount are not valid.

9. The method of claim 8 including the further step of:

sending an error message to the user that the destination identifier or the postal amount are not valid.

10. The method of claim 6 comprising the further steps of:

rejecting the digital token request if the postage amount or the destination postal code is not valid;

comparing the postage amount with a postage limit amount and available postage funds stored in the vault; and rejecting the digital token request if the postage amount exceeds the postage limit amount or the available postage funds.

* * * * *